United States Patent
Sato

(10) Patent No.: US 7,241,518 B2
(45) Date of Patent: Jul. 10, 2007

(54) MAGNETIC RECORDING MEDIUM AND METHOD OF MANUFACTURING A MAGNETIC RECORDING MEDIUM

(75) Inventor: Satoshi Sato, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/488,983

(22) PCT Filed: Jul. 14, 2003

(86) PCT No.: PCT/JP03/08907

§ 371 (c)(1),
(2), (4) Date: Mar. 9, 2004

(87) PCT Pub. No.: WO2004/008440

PCT Pub. Date: Jan. 22, 2004

(65) Prior Publication Data

US 2004/0234796 A1   Nov. 25, 2004

(30) Foreign Application Priority Data

Jul. 15, 2002 (JP) ............................. 2002-205336

(51) Int. Cl.
*G11B 5/706* (2006.01)
*B05D 5/10* (2006.01)

(52) U.S. Cl. .............. 428/832.1; 428/847.1; 428/847.4; 428/847.7; 427/131

(58) Field of Classification Search ........ 428/611, 428/687, 65.3, 328, 329, 336, 694 R, 694 T, 428/694 TP, 694 TR, 694 BG, 694 BN, 694 ST, 428/694 SG, 838, 839, 839.6, 832.1, 820, 428/450, 831.2, 847.1, 847.4, 847.7; 427/131; 369/283, 286

See application file for complete search history.

(56) References Cited

U.S. PATENT DOCUMENTS 5,723,212 A * 3/1998 Kitaori et al. ............. 428/837

(Continued)

FOREIGN PATENT DOCUMENTS

EP    1 089 262    * 4/2001

(Continued)

OTHER PUBLICATIONS

Translation JPO 2002-183933.*

(Continued)

*Primary Examiner*—Carol Chaney
*Assistant Examiner*—Louis de Falasco
(74) *Attorney, Agent, or Firm*—Robert J. Depke; Rockey, Depke, Lyons & Kitzinger LLC.

(57) ABSTRACT

It is a magnetic recording medium for which favorable values for all of reproduced output, noise level and error rate can be obtained, and which is also superior in terms of storage stability. A magnetic recording medium (10), which has a configuration in which a magnetic layer (3) comprised of a maghemite thin film containing cobalt is formed on a tape-shaped substrate (1) comprised of aromatic polyimide, and in which the substrate (1) is 3 to 10 μm in thickness, and 5 to 30 nm in its ten-point average roughness (SRz) of the surface on which the magnetic layer (3) is formed, and the magnetic layer (3) is 10 to 50 nm in thickness, 0.1 to 3.0 nm in center plane average thickness (SRa), and 2,000 to 4,000 Oe (158,000 to 316,000 A/m) in in-plane coercivity, is made.

8 Claims, 1 Drawing Sheet

U.S. PATENT DOCUMENTS

| | | | |
|---|---|---|---|
| 6,174,597 B1 * | 1/2001 | Yusu et al. | 428/836.2 |
| 6,210,775 B1 * | 4/2001 | Ejiri et al. | 428/840.1 |
| 6,312,785 B1 * | 11/2001 | Sato | 428/694 SG |
| 6,458,453 B1 * | 10/2002 | Hayashi et al. | 428/694 BN |
| 6,500,551 B1 * | 12/2002 | Hashimoto et al. | 428/844.8 |
| 6,579,592 B1 * | 6/2003 | Matsubaguchi et al. | 428/694 BA |
| 6,582,815 B2 * | 6/2003 | Naoe et al. | 428/694 BN |
| 6,746,786 B2 * | 6/2004 | Santoki et al. | 428/832.1 |
| 2002/0068193 A1 * | 6/2002 | Santoki et al. | 428/694 T |
| 2003/0017365 A1 * | 1/2003 | Doushita et al. | 428/820.6 |
| 2004/0023066 A1 * | 2/2004 | Watase et al. | 428/820 |
| 2004/0081857 A1 * | 4/2004 | Sasaki | 428/694 BA |

FOREIGN PATENT DOCUMENTS

| | | | |
|---|---|---|---|
| EP | 1 113 425 | * | 7/2001 |
| JP | 63-188823 A | | 8/1988 |
| JP | 11-120535 A | | 4/1999 |
| JP | 2000-215433 A | | 8/2000 |
| JP | 2001-176045 A | | 6/2001 |
| JP | 2001-176050 A | | 6/2001 |
| JP | 2001-250216 A | | 9/2001 |
| JP | 2001-283425 A | | 10/2001 |
| JP | 2001-307319 A | | 11/2001 |
| JP | 2002-140812 A | | 5/2002 |
| JP | 2002-183933 A | | 6/2002 |

OTHER PUBLICATIONS

Translation JPO 2001-307319.*
Translation JPO 11-120535.*
Translation JPO 2001-283425.*

* cited by examiner

10

MAGNETIC RECORDING MEDIUM AND METHOD OF MANUFACTURING A MAGNETIC RECORDING MEDIUM

This application claims priority to Japanese Patent Application No. JP2002-205336, filed Jul. 15, 2002 which is incorporated herein by reference.

TECHNICAL FIELD

The present invention relates to a high density magnetic recording medium, and particularly to a magnetic recording medium that has favorable storage stability in a system using a magnetoresistive magnetic head (MR head).

BACKGROUND ART

In recent years, with respect to magnetic recording media, higher recording densities are being increasingly demanded. Especially these days, in order to achieve further high-density recording, with respect to magnetic heads used in performing reproduction of recorded signals, magnetoresistive magnetic heads (MR heads) are becoming more popular in place of conventional inductive heads, and are being adopted for so-called magnetic tapes and not only hard disks.

As recording media for performing recording and reproduction by such a magnetoresistive magnetic head (MR head), so-called metal thin film type magnetic recording media are used, and in line with the demand for higher density recording described above, achieving a further increase in coercivity and reduction in noise is becoming necessary.

In addition, along with the advances in high density recording, the demand for so-called archivability, where storage over extended periods without the occurrence of degradation in signal quality is possible, is becoming more stringent.

As one that meets such various demands made of magnetic recording media, in Japanese Patent Application Publication No. Hei-11-110731 and Japanese Patent Application Publication No. 2001-250216, there is proposed a magnetic recording medium for use as a hard disk of a configuration in which the magnetic layer is formed of a maghemite thin film containing cobalt.

The magnetic recording medium proposed in each of the publications above, which has a magnetic layer of a ferrite film, has such advantages as being more stable, corrosion resistant and superior in long-term storability as compared to coated type magnetic recording media in which the magnetic layer is formed of a magnetic coating in which magnetic powder is dispersed in a binder, or Co/CoO evaporated magnetic recording media and the like.

However, in applying such a magnetic layer of a ferrite film as described above to magnetic tapes, not only must magnetic properties such as the coercivity Hc of the magnetic layer be improved, but the abrasion of the surface due to contact between an MR head and the magnetic tape becomes a problem, and therefore it becomes important to control the surface properties of the magnetic recording medium.

As such, in the present invention, in view of the problems described above, surface properties of a magnetic tape type magnetic recording medium in particular are studied, and a magnetic recording medium having an appropriate roughness, and in which various properties such as chemical stability, magnetic properties, running stability, running durability are improved, is provided.

DISCLOSURE OF THE INVENTION

A magnetic recording medium of the present invention is taken to have a configuration in which a magnetic layer made of a maghemite thin film containing cobalt is formed on a tape-shaped substrate made of aromatic polyimide. It is defined that the thickness of the substrate is 3 to 10 µm, the ten-point average roughness (SRz) of the surface on which the magnetic layer is formed is 5 to 30 nm, the thickness of the magnetic layer is 10 to 50 nm, the center plane average roughness (SRa) is 0.1 to 3.0 nm, and the in-plane coercivity is 2,000 to 4,000 Oe (158,000 to 316,000 A/m).

It is defined that in a method of manufacturing a magnetic recording medium of the present invention, a foundation layer and a magnetic layer, which is made of a maghemite thin film containing cobalt, are formed sequentially on a tape-shaped substrate made of aromatic polyimide and whose thickness as supported while running is 3 to 10 µm, and whose ten-point average roughness (SRz) of the surface on which the magnetic layer is formed is 5 to 30 nm. It is defined that the thickness of the magnetic layer is 10 to 50 nm, the center plane average roughness (SRa) is 0.1 to 3.0 nm, and the in-plane coercivity is 2,000 to 4,000 Oe (158,000 to 316,000 A/m).

According to the present invention, favorable values can be achieved for all of reproduced output, noise level and error rate, and a magnetic recording medium that is by far superior in terms of storage stability as compared to existing magnetic tapes can be obtained.

BEST MODES FOR CARRYING OUT THE INVENTION

Figure 1:
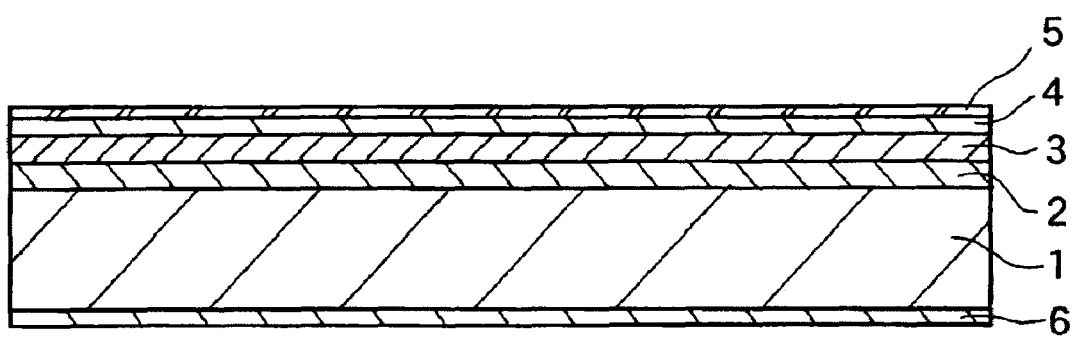
FIG. 1 is a schematic sectional view of a magnetic recording medium of the present invention.

Specific embodiments of a magnetic recording medium of the present invention will be described, however the present invention is not to be limited to the examples below.

A schematic sectional view of an example of a magnetic recording medium 10 of the present invention is shown in FIG. 1.

The magnetic recording medium 10 has a configuration in which a foundation layer 2, a magnetic layer 3 and a protective layer 4 are formed sequentially on a tape-shaped non-magnetic substrate 1.

The substrate 1 is formed of, in particular, aromatic polyimide.

For the substrate 1, considering use as a magnetic tape, one which is tape-shaped and whose thickness is 10 µm or below is suitable. In addition, in order to secure sufficient contact with the magnetic head, it is necessary that it be 3 µm or above.

The substrate 1 may have a single layer structure or a multi-layer structure in which two or more layers are layered. Further, some adhesive layer may be provided on the surface of the substrate 1 so as to enhance adhesion with the later-described foundation layer 2 or back coat layer 6.

In order to improve the durability and running characteristics of the magnetic recording medium 10 ultimately obtained, as well as handling during film formation of the magnetic tape, fine particles may be provided internal to the aromatic polyimide substrate 1. As these fine particles, for example, calcium carbonate, silica, alumina and the like may be used.

In addition, in order to prevent the occurrence of scraping due to contact between the magnetic recording medium 10 and a magnetic head, the ten-point average roughness (SRz) of the side of the aromatic polyimide substrate 1 on which the magnetic layer is formed is made to be 5 nm or greater. However, when SRz exceeds 30 nm, since the spacing between the magnetic head and the magnetic recording medium 10 increases, recording and reproducing characteristics degrade, and error rate increases, it is preferable that the ten-point average roughness (SRz) of the side of the aromatic polyimide substrate 1 on which the magnetic layer is formed be 5 nm to 30 nm.

The foundation layer 2 can be formed by depositing a NiO film on the substrate 1 by sputtering a Ni metal as a target under an oxygen and argon atmosphere through, for example, a reactive sputtering method.

The magnetic layer 3 can be formed by, after the foundation layer 2 is formed as described above, sputtering a magnetic metal alloy containing Co as a target under an atmosphere of oxygen and argon to form a magnetite film containing Co and then performing a thermal treatment to make it a maghemite film containing Co.

If the magnetic layer 3 is formed with, for example, an alloy of Fe and Co as a target, it is preferable for the amount of Co added in the maghemite film containing Co be 1 to 10 weight % relative to Fe. Although the coercivity of the magnetic recording medium 10 can be made higher by increasing the amount of Co added, when the amount of Co added exceeds 10 weight %, the stability of the magnetic recording medium 10 over time decreases.

It is preferable that the in-plane coercivity of the maghemite film containing Co constituting the magnetic layer 3 be 2,000 to 4,000 Oe (158,000 to 316,000 A/m). This is because in order to realize low noise and high resolution for the magnetic recording medium, it is necessary that it be 2,000 Oe (158,000 A/m) or greater, and on the other hand because when the in-plane coercivity exceeds 4,000 Oe (316,000 A/m), sufficient recording becomes impossible and reproduced output decreases.

10 to 50 nm is suitable as the thickness of the magnetic layer 3. This is because when the thickness of the magnetic layer is made less than 10 nm, sometimes sufficient coercivity cannot be obtained, and on the other hand, because when it is formed thicker than 50 nm, coercivity becomes higher, but the particles forming the film become larger, as a result of which noise increases and further a problem arises in that MR heads saturate, and distortion occurs in the reproduced output.

In addition, the center plane average roughness (SRa) of the magnetic layer 3 is made 0.1 to 3.0 nm. When the center plane average roughness (SRa) is made less than 0.1 nm and the surface of the magnetic layer 3 is made smooth, it causes an increase in error rate due to occurrences of scraping due to friction between the magnetic recording medium 10 and magnetic heads, and there is also a problem in that wear of magnetic heads increases. On the other hand, when the surface of the magnetic layer 3 is made rougher such that the center plane average roughness (SRa) exceeds 3.0 nm, there is a problem in that the spacing between the magnetic recording medium and magnetic heads increases, sufficient recording and reproducing properties cannot be achieved, and error rate increases.

The protective layer 4 may be formed through a PVD method such as sputtering and the like or through a CVD method.

In forming it through a CVD method, a hydrogen carbonate gas or a mixed gas of hydrogen carbonate gas and inert gas is introduced into a vacuum vessel, and plasma of hydrogen carbonate gas is generated by discharging electricity in the vacuum vessel under a condition in which pressure is held between 10 to 100 [Pa] to form a thin film of carbon on the magnetic layer 3. For discharging electricity, either of an external electrode method and an internal electrode method is good, and the discharge frequency is determined experimentally.

In addition, by applying a voltage of 0 to −3 [kV] to the electrode on the substrate side, it is possible to enhance the hardness and improve the adhesiveness of the carbon protective layer 4.

As the hydrogen carbonate gas mentioned above, methane, ethane, propane, butane, pentane, hexane, heptane, octane, ethylene, acetylene, propene, butene, pentene, benzene and the like may be applied.

It is preferable that the protective layer 4 be formed in a thickness of 6 to 10 nm so that it does not affect the spacing of the magnetic recording medium 10 or its properties as a magnetic tape.

On the protective layer 4 mentioned above, in order to improve running characteristics, an optional perfluoropolyether lubricant may be applied to form a lubricant layer 5.

In addition, an optional back coat layer 6 may be formed on the side opposite the side on which the magnetic layer 3 is formed.

It is preferable that the electric resistance of the surface of such a magnetic recording medium 10 as described above be 50 to 3,000 MΩ, and it is further preferable that it be 0.1 to 10 MΩ.

The electric resistance of the surface of the magnetic recording medium 10 can be controlled to a desired value by adjusting the amount of oxygen supplied during sputtering at the time of forming the magnetic layer 3, or by forming an optional foundation layer using Cu, Cr, Al or the like.

Hereinafter, specific examples of a magnetic recording medium of the present invention will be described based on experiment results.

EXAMPLE 1

First., the foundation layer 2 is formed on the substrate 1.

As the substrate 1, a continuous polyimide film of a thickness of 7 μm was prepared, and was contacted with the peripheral surface of a can roll, which was equipped with heating means, to be heated to 150° C. Further, it was carried at a speed of 10 m/min, and a NiO film of a thickness of 50 nm was formed by sputtering a Ni metal target by a reactive sputtering method in an atmosphere comprised of argon and oxygen where the oxygen partial pressure was 0.1 Pa, and the total pressure was 0.4 Pa.

Next, the magnetic layer 3 is formed on the foundation layer 2.

A magnetite film containing Co was formed on the substrate 1, on which the foundation layer 2 (the NiO film) was formed as described above, in a thickness of 30 nm by performing sputtering with a Fe+4 (wt %) Co metal alloy as a target under a thermal condition of 150° C. and in an atmosphere comprised of argon and oxygen where the oxygen partial pressure was 0.07 Pa and the total pressure was 0.5 Pa.

Next, the magnetic layer 3 comprised of a maghemite film was formed by carrying, in an oven heated to 300° C. in the atmosphere, the substrate 1 on which the magnetite film was formed as mentioned above at a feeding speed of 5 m/min, and performing a thermal treatment.

Next, the protective layer 4 comprised of a diamond-like carbon film was formed on the magnetic layer formed as described above, the lubricant layer 5 was formed by applying a perfluoropolyether lubricant on the protective layer 4, and the desired magnetic recording medium 10 was made.

Further, this was cut in widths of 8 mm and sample magnetic tapes were obtained.

Next, of the conditions for making the magnetic recording medium, by altering predetermined conditions as mentioned below, and keeping other manufacturing conditions similar to example 1 above, sample magnetic tapes of example 2 through example 9 and comparative example 1 through comparative example 5 were made.

In addition, as comparative examples 6 and 7, commercially sold magnetic tapes were adopted.

EXAMPLE 2

The thickness of the substrate 1 comprised of aromatic polyimide was made 3 μm.

EXAMPLE 3

The ten-point average roughness (SRz) of the side of the substrate 1 comprised of aromatic polyimide on which the magnetic layer is formed was made to be 30 nm.

EXAMPLE 4

The thickness of the magnetic layer 3 comprised of a cobalt ferrite thin film was made to be 10 nm.

EXAMPLE 5

The thickness of the magnetic layer 3 comprised of a cobalt ferrite thin film was made to be 50 nm.

EXAMPLE 6

The coercivity of the magnetic layer 3 comprised of a cobalt ferrite thin film was made to be 2,000 Oe (158,000 A/m).

EXAMPLE 7

The coercivity of the magnetic layer 3 comprised of a cobalt ferrite thin film was made to be 4,000 Oe (316,000 A/m).

EXAMPLE 8

The gas pressure at the time of forming the magnetic layer 3 comprised of a cobalt ferrite thin film was made to be 0.6 Pa, and the center plane average roughness (SRa) of the magnetic layer 3 was made to be 3.0 nm.

EXAMPLE 9

In place of the heating treatment in the atmosphere in example 1 above, a sputtering process was performed under an atmosphere having excessive oxygen, and thus a magnetic layer 3 comprised of a maghemite film whose center plane average roughness (SRa) is 0.6 nm was formed.

COMPARATIVE EXAMPLE 1

As the substrate 1, an aromatic polyimide film of a thickness of 2 μm was adopted.

COMPARATIVE EXAMPLE 2

The ten-point average roughness (SRz) of the substrate 1 comprised of an aromatic polyimide film on the side on which the magnetic layer is formed was made to be 4 nm.

COMPARATIVE EXAMPLE 3

The thickness of the magnetic layer 3 comprised of a cobalt ferrite thin film was made to be 8 nm.

COMPARATIVE EXAMPLE 4

By an increase in the amount of cobalt contained in the FeCo target at the time of forming the magnetic layer 3, the coercivity of the magnetic layer 3 comprised of a cobalt ferrite thin film was made to be 5,000 Oe (395,000 A/m).

COMPARATIVE EXAMPLE 5

The thickness of the magnetic layer 3 comprised of a cobalt ferrite thin film was made to be 60 μm.

COMPARATIVE EXAMPLE 6

For purposes of comparing storage stability, a commercially sold AIT-2 evaporated tape, SDX2-50C, was used.

COMPARATIVE EXAMPLE 7

For purposes of comparing storage stability, a commercially sold DDS4 evaporated tape, DGD150P, was used.

In addition, it is assumed that the evaporated tapes of comparative examples 6 and 7 mentioned above do not have a protective layer nor a lubricant layer formed on a maghemite film containing cobalt.

With respect to each of the magnetic tapes made as described above, electromagnetic conversion characteristics were measured, and evaluations were performed.

Specifically, after information signals were recorded at a recording wave length of 0.5 μm on each of the sample magnetic tapes using a modified AIT drive, measurements of each of reproduced output, noise level (the value at a frequency down by 1 MHz from the carrier signal) and error rate were taken with a yoke-type GMR head.

With respect to the reproduced output, as an evaluation criterion, the measurement of example 1 was taken to be a reference value, and cases which fell below this by 2 dB or more were evaluated as x.

With respect to noise level, the value of example 1 was taken to be a reference value, and cases which fell below this by 1 dB or more were evaluated as x.

With respect to the error rate, cases that were lower than $1.0 \times 10^{-4}$ were evaluated as O, and cases equal to or greater than $1.0 \times 10^{-4}$ were evaluated as x.

As for storage stability, after being left in an atmosphere of 40° C. and 80% humidity for a week, those whose saturation magnetization dropped by 3% or more were evaluated as x, and those whose amount of decrease was less than 3% were evaluated as O.

In addition, the sample magnetic tapes of comparative examples 6 and 7 were evaluated only with respect to storage stability.

The configuration of each sample magnetic tape is indicated in table 1 below, and the evaluation results mentioned above are shown in table 2 below.

TABLE 1

| | Substrate | | Magnetic Layer (Cobalt Maghemite film) | | |
|---|---|---|---|---|---|
| | Thickness (μm) | SRz (nm) | Thickness (nm) | SRa (nm) | Hc (Oe) |
| Ex. 1 | 7 | 15 | 30 | 1.0 | 2500 |
| Ex. 2 | 3 | 15 | 30 | 1.0 | 2500 |
| Ex. 3 | 7 | 30 | 30 | 1.0 | 2500 |
| Ex. 4 | 7 | 15 | 10 | 1.0 | 2500 |
| Ex. 5 | 7 | 15 | 50 | 1.8 | 2500 |
| Ex. 6 | 7 | 15 | 30 | 1.0 | 2000 |
| Ex. 7 | 7 | 15 | 30 | 1.0 | 4000 |
| Ex. 8 | 7 | 15 | 30 | 3.0 | 2500 |
| Ex. 9 | 7 | 15 | 30 | 0.6 | 2500 |
| Comp. Ex. 1 | 2 | 15 | 30 | 1.0 | 2500 |
| Comp. Ex. 2 | 7 | 4 | 30 | 1.0 | 2500 |
| Comp. Ex. 3 | 7 | 15 | 8 | 0.8 | 1800 |
| Comp. Ex. 4 | 7 | 15 | 30 | 1.0 | 5000 |
| Comp. Ex. 5 | 7 | 15 | 60 | 2.0 | 3000 |
| Comp. Ex. 6 | Commercially sold AIT-2 evaporated tape, SDX2-50C | | | | |
| Comp. Ex. 7 | Commercially sold DDS4 evaporated tape, DGD150P | | | | |

TABLE 2

| | Reproduced Output | Noise Level | Error Rate | Storage Characteristics |
|---|---|---|---|---|
| Ex. 1 | O | O | O | O |
| Ex. 2 | O | O | O | O |
| Ex. 3 | O | O | O | O |
| Ex. 4 | O | O | O | O |
| Ex. 5 | O | O | O | O |
| Ex. 6 | O | O | O | O |
| Ex. 7 | O | O | O | O |
| Ex. 8 | O | O | O | O |
| Ex. 9 | O | O | O | O |
| Comp. Ex. 1 | x | O | x | O |
| Comp. Ex. 2 | O | O | x | O |
| Comp. Ex. 3 | O | x | O | O |
| Comp. Ex. 4 | — | — | — | — |
| Comp. Ex. 5 | — | — | — | — |
| Comp. Ex. 6 | | | | x |
| Comp. Ex. 7 | | | | x |

As is apparent from table 1 and table 2 above, with respect to the magnetic tapes of examples 1 through 9, in which a magnetic layer, comprised of a maghemite thin film containing cobalt and whose thickness is 10 to 50 nm, center plane average roughness (SRa) is 0.1 to 3.0 nm, and in-plane coercivity is 2,000 to 4,000 Oe (158,000 to 316,000 A/m), is formed on a substrate, comprised of aromatic polyimide and whose thickness is 3 to 10 μm and whose ten-point average roughness (SRz) of the side on which the magnetic layer is formed is 5 to 30 nm, favorable results for all of reproduced output, noise level and error rate, which are demanded of high density magnetic recording media, were obtained, and with respect to storage stability, too, superior results were obtained as compared to existing magnetic tapes (comparative examples 6 and 7).

On the other hand, with the magnetic tape of comparative example 1, whose thickness of the substrate 1 comprised of aromatic polyimide was made to be 2 μm, sufficient contact with the magnetic head could not be achieved, and the reproduced output decreased.

With the magnetic tape of comparative example 2, whose ten-point average roughness (SRz) of the substrate 1, comprised of an aromatic polyimide film, on the side on which the magnetic layer is formed was less than 5 nm, sufficient durability could not be secured, and the reproduced output decreased.

With the magnetic tape of comparative example 3 whose thickness of the magnetic layer 3 was less than 10 nm, coercivity was low, and the noise level increased.

With the magnetic tape of comparative example 4 in which the coercivity of the magnetic layer 3 was made to be 5,000 Oe (395,000 A/m), distortion occurred in the recorded signals, and reproduced output could not be obtained.

With the magnetic tape of comparative example 5 in which the thickness of the magnetic layer 3 was made to be 60 nm, the reproducing MR head saturated, and reproduction could not be performed.

According to the present invention, in a magnetic recording medium of a configuration in which a magnetic layer comprised of a maghemite thin film containing cobalt is formed on a tape shaped substrate comprised of aromatic polyimide, by specifying a configuration in which the thickness of the substrate is 3 to 10 μm, the ten-point average roughness (SRz) of the surface on which the magnetic layer is formed is 5 to 30 nm, the thickness, the center plane average roughness (SRa), and the in-plane coercivity of the magnetic layer are, respectively, 10 to 50 nm, 0.1 to 3.0 nm and 2,000 to 4,000 Oe (158,000 to 316,000 A/m), favorable results were obtained for all of reproduced output, noise level, and error rate which are demanded of high density magnetic recording media, and it was possible to make it one which is also, by far, superior in terms of storage stability and corrosion resistance as compared to existing magnetic tapes.

The invention claimed is:

1. A magnetic recording medium comprising: a magnetic layer including a maghemite thin film containing cobalt formed on a tape-shaped substrate including aromatic polyimide,
    wherein the thickness of said substrate is 3 to 10 μm and the ten-point average roughness (SRz) of a surface of said substrate on which said magnetic layer is formed is 15 to 30 nm, and
    wherein the thickness of said magnetic layer is 10 to 50 nm, the center plane average roughness (SRa) of said magnetic layer is 0.1 to 3.0 nm and the in-plane coercivity of said magnetic layer is 2,000 to 4,000 Oe (158,000 to 316,000 A/m).

2. The magnetic recording medium according to claim 1 wherein reproduction of recorded signals is carried out using a magnetic head of a magnetoresistive type.

3. A method of manufacturing a magnetic recording medium, including the steps of:
    forming a substrate including aromatic polyimide having a thickness of 3 to 10 μm and a ten-point average roughness (SRz) of a surface on which a magnetic layer is formed of 15 to 30 nm,
    sequentially and continuously forming a foundation layer and a magnetic layer including a maghemite thin film containing cobalt on said substrate, and
    wherein the thickness, center plane average roughness (SRa) and in-plane coercivity of said magnetic layer are made to be, respectively, 10 to 50 nm, 0.1 to 3.0 nm and 2,000 to 4,000 Oe (158,000 to 316,000 A/m).

4. The magnetic recording medium according to claim 1, wherein the resistance of the surface of the magnetic recording medium is 50 to 3,000 MΩ.

5. The magnetic recording medium according to claim 1, wherein the resistance of the surface of the magnetic recording medium is 1 to 10 MΩ.

6. A magnetic recording medium comprising: a magnetic layer including a maghemite thin film containing cobalt formed on a tape-shaped substrate including aromatic polyimide, wherein the thickness of said substrate is 3 to 10 μm and the ten-point average roughness (SRz) of a surface of said substrate on which said magnetic layer is formed is between 15 and 30 nm, and wherein the thickness of said magnetic layer is 10 to 50 nm, the center plane average roughness (SRa) of said magnetic layer is 0.1 to 3.0 nm and the in-plane coercivity of said magnetic layer is 2,000 to 4,000 Oe (158,000 to 316,000 A/m).

7. A magnetic recording medium comprising:

a foundation layer formed over a substrate;

a magnetic layer formed over the foundation layer, the magnetic layer including a maghemite thin film containing cobalt formed on a tape-shaped substrate including aromatic polyimide, a protective layer formed over the magnetic layer;

wherein the thickness of said substrate is 3 to 10 μm and the ten-point average roughness (SRz) of a surface of said substrate over which said magnetic layer is formed is from greater than 15 to 30 nm, and wherein the thickness of said magnetic layer is 10 to 50 nm, the center plane average roughness (SRa) of said magnetic layer is 0.1 to 3.0 nm and the in-plane coercivity of said magnetic layer is 2,000 to 4,000 Oe (158,000 to 316,000 A/m).

8. The magnetic recording medium of claim 7, wherein the maghemite film contains both Fe and Co and wherein the Co content is from one to 10 weight percent relative to the Fe.

* * * * *